United States Patent [19]

Walisser

[11] Patent Number: 4,960,826

[45] Date of Patent: Oct. 2, 1990

[54] MELAMINE-CONTAINING RESOLE RESITOL AND RESITE COMPOSITIONS

[75] Inventor: Wayne R. Walisser, Floyd Knobs, Ind.

[73] Assignee: Borden, Inc., Columbus, Ohio

[21] Appl. No.: 157,975

[22] Filed: Feb. 19, 1988

[51] Int. Cl.$^5$ .......................... C08K 7/14; C08G 14/10
[52] U.S. Cl. ..................................... 524/494; 524/596; 528/163; 528/164
[58] Field of Search ................ 528/163, 164; 524/493, 524/494, 723, 595, 596; 525/497

[56] References Cited

U.S. PATENT DOCUMENTS

| | | | |
|---|---|---|---|
| Re. 30,375 | 8/1980 | Deuzeman et al. | 260/29.3 |
| 2,315,400 | 3/1943 | D'Alelio | 528/163 |
| 2,931,738 | 4/1960 | Stalego | 117/126 |
| 3,002,857 | 10/1961 | Stalego | 117/126 |
| 3,072,595 | 1/1963 | Barth et al. | 260/45.1 |
| 3,223,668 | 12/1965 | Stalego | 260/29.3 |
| 3,253,948 | 5/1966 | Tiede | 117/126 |
| 3,331,885 | 7/1967 | Rider et al. | 260/826 |
| 3,487,048 | 12/1969 | Deuzeman | 260/67.7 |
| 3,616,179 | 10/1971 | McCombs | 161/170 |
| 3,617,428 | 11/1971 | Carlson | 161/133 |
| 3,624,246 | 11/1971 | Deuzeman | 260/21 |
| 3,702,798 | 11/1972 | Shannon | 161/170 |
| 3,707,296 | 12/1972 | Palazzolo | 280/11.13 L |
| 3,734,918 | 5/1973 | Mayer et al. | 260/29.3 |
| 3,817,920 | 6/1974 | Langager | 260/47 R |
| 3,819,441 | 6/1974 | Fargo et al. | 156/167 |
| 3,839,236 | 10/1974 | Foley et al. | 260/2 S |
| 3,907,724 | 9/1975 | Higginbottom | 260/7 |
| 3,915,905 | 10/1975 | Hanton | 260/2.5 F |
| 3,919,134 | 11/1975 | Higginbottom | 260/7 |
| 3,956,204 | 5/1976 | Higginbottom | 260/7 |
| 3,956,205 | 5/1976 | Higginbottom | 260/7 |
| 4,060,504 | 11/1977 | Higginbottom | 260/7 |
| 4,176,105 | 11/1979 | Miedaner | 260/29.3 |
| 4,285,848 | 8/1981 | Hickson | 260/29.3 |
| 4,324,833 | 4/1982 | Yan | 428/290 |
| 4,611,020 | 9/1986 | Bornstein et al. | 524/233 |
| 4,757,108 | 7/1988 | Walisser | 524/596 |

FOREIGN PATENT DOCUMENTS

| | | |
|---|---|---|
| 683139 | 3/1964 | Canada . |
| 1001788 | 12/1976 | Canada . |
| 1026882 | 2/1978 | Canada . |
| 1049172 | 2/1979 | Canada . |
| 1056973 | 6/1979 | Canada . |
| 1080871 | 7/1980 | Canada . |
| 53-92892 | 8/1978 | Japan . |
| 1273152 | 5/1972 | United Kingdom . |

OTHER PUBLICATIONS

Chem. Abs., 103:216573g.
Solomon, *The Chemistry of Organic Film Formers*, John Wiley & Sons, Inc. New York (1967), pp. 235-244.

*Primary Examiner*—Veronica P. Hoke
*Attorney, Agent, or Firm*—Fisher, Christen & Sabol

[57] ABSTRACT

The titled compositions are useful binding adhesives, especially, for example, with engineered glass fiber-containing products, and the like. In the A-stage, the compositions are typically exceptionally water soluble and low temperature storage stable. Such compositions can be prepared initially by a procedure in which a resole or the like is copolymerized with free melamine(s) and is conditioned to include acidic stage conditioning. For example, phenol per se, formaldehyde and sodium hydroxide followed by melamine per se and aqueous sulfamic acid solution, with subsequent neutralization, can yield the exceptionally water soluble low temperature storage stable A-stage composition. The C-stage composition is non-punking and can be structurally hard and sound.

32 Claims, No Drawings

MELAMINE-CONTAINING RESOLE RESITOL AND RESITE COMPOSITIONS

FIELD

This invention concerns resole, resitol and resite, and melamine-containing and the like compositions, with procedures, i.e., method(s) or process(es), for preparation and use of same. These compositions are useful bonding adhesives.

BACKGROUND

Common thermosetting phenol formaldehyde type system binders are generally provided as water soluble or water dispersable compositions, which are intended to be easily blended with other ingredients, and which are diluted to low concentrations. It is the diluted compositions which are contacted with such fibers as those employed in engineered, shaped or molded glass fiber products and so forth in order to bind them so in their manufacture.

In such manufacture, the amount of binder employed is in general the amount necessary to lock each fiber into the mass by bonding the fibers where they cross or overlap. For this reason, the binder composition should have good flow characteristics so that it can be applied at a low volume which will flow to mat fiber intersections. The binder composition should be able to be readily thermally cured during normal production cycles. It should be relatively stable for periods of time long enough to permit mixing and application at temperatures ordinarily encountered in fiberizing plants, and the composition should be so dilutable that it permits variations in concentrations for different end products. The cured binder product should provide a strong bond to give sufficient strength and stiffness to the product.

A binder composition much desired is one that can withstand service temperatures of 700° F. to 900° F. A particulary troublesome aspect of binders prepared from a phenol formaldehyde resin system is that such binders exhibit a propensity toward punking when subjected to temperatures in excess of 600° F., which are within the range of temperatures that may be encountered in certain uses.

In the past, a variety of approaches have been taken in an effort to formulate high temperature binder compositions using phenolic resins as the primary binder ingredient. Modification of the phenolic by the addition of nitrogenous modifiers such as dicyandiamide is disclosed by Stalego in U.S. Pat. No. 3,223,668 (Dec. 14, 1965). Borates of various sorts as additives to the binder compositions have been tried. See, e.g., Stalego, U.S. Pat. Nos. 2,931,738 (Apr. 5, 1960) and 3,002,857 (Oct. 3, 1961); Tiede, U.S. Pat. No. 3,253,948 (May 31, 1966), and Foley et al., U.S. Pat. No. 3,839,236 (Oct. 1, 1974).

Urea has been used in the past in phenolic resin binders, especially for its non-punking properties. See e.g., Barth et al., Pat. No. 3,072,595 (Jan. 8, 1963). However, the presence of urea in such binding compositions typically results in a marked lack of stability during low temperature storage of the binder. Binders containing urea are often prone to undergo irreversible phase separation. This separation may also occur in as few as five or six hours, at room temperature, and hence, typical binders containing urea or urea resins can be difficult to use from a processing standpoint.

Walisser in U.S. patent application Ser. No. 875,536 filed June 18, 1986, now U.S. Pat. No. 4,787,108 describes a water soluble phenolic resole-urea composition. That invention, commonly assigned herewith, provides a water soluble, cold storage stable composition made from a phenolic resole that is reacted with urea under acidic conditions and is next neutralized, which retains its good solubility and inhibition to tetra dimer (tetramethylol-4,4′-dihydroxydipehnylmethane) crystallization during cold storage at a temperature from 0° C. to 15° C.

Resole urea binders are typically more soft than resole binders without urea in their cured state. As such, resole urea binders are more particularly suited to low density, resilient thermal insulation end uses as opposed to high density rigid molded or shaped glass fiber containing product end uses where a hard binder is required.

Known resole-alkoxylated melamine binders have been used for the preparation of punk resistant glass fiber products because of the good water miscibility accorded such derivatized (alkoxylated) melamine formaldehyde resins/resole resin mixtures. However, such known alkoxylated melamine formaldehyde/resoles are still prone to lose water tolerance. Known underivatized melamine formaldehyde compositions and especially mixtures of these with resoles are generally unusable because they have very poor water miscibility as exhibited by the turbid solutions that form when such underivatized resins or mixtures are diluted with less than 5 parts water. Good miscibility or solubility in a minimum of 20 parts water is a standard industrial requirement of glass fiber binding resins.

Resoles containing methoxymethyl aminotriazines or methoxymethyl melamines are described by Higginbottom in Canadian Pat. Nos. 1,026,882 (Feb. 21, 1978) and 1,049,172 (Feb. 20, 1979). These patents especially recognize the characteristic of inhibition of tetra dimer crystallization at low temperatures from addition of ceiling additives. However, such products are usable typically only in emulsifiable form, and they may not be commercially viable.

Further, known melamine-containing compositions generally must be stabilized before use with resoles and/or with alcohols, diols and/or triols, and so forth. This is done primarily to provide water miscibility.

For these and other known reasons, resole and melamine compositions that are fully soluble in water, storage stable, yet fast setting and curing, and low in free phenol and free formaldehyde content, and hard when cured, are desirable. There further exists a need for such a single aqueous phenolic resole and melamine system as one which contains all the necessary antipunk ingredients to confer oxidation and thermal stability upon a bindable material, for example, a glass fiber or mineral fiber matrix, prepared therewith, which can be handled like a conventional liquid resole upon application to the bindable material. A fully water soluble, storage stable melamine-containing resole composition should be blendable with water without phase separation or formation of gummy deposits which might clog pumps, pipes and spray nozzles, and it might well be blendable with other suitable resoles. Further, such a resole and melamine composition low in free phenol and free formaldehyde content should thus release a minimal quantity of pollutants to the atmosphere and work areas. Also, fast setting and curing properties, and ability to provide structurally sound C-stage products, would enhance utility and commercial value significantly. Heretofore, the known art has lacked such compositions, and accordingly, the art has further lacked procedures for preparing and using same.

SUMMARY

The invention provides res(ole)(itol)(ite)-melamine and the like compositions. This type of composition can be prepared by serially contacting at least one fundamental alkaline resole with at least one free melamine, conditioning, providing acidic conditions therefor with further conditioning, under conditions aqueous to at least the A-stage such that said composition is prepared. These compositions are useful bonding adhesives, especially with such glass fiber matrix compositions as so-called engineered, shaped or molded glass fiber containing fabricated parts such as, for example, automobile top liners and hood liners, air and liquid glass fiber filtration media, and so forth.

The inventive composition has many advantages, which include the following significant features: (1) its A-stage form is fully water soluble, and accordingly it can be used as such, or it can be mixed with other suitable adhesive binders and binder ingredients; (2) it has in its A-stage an excellent low temperature storage life; (3) the very fast set and cure times of this binder, the latter as typically measured by hot plate cure, greatly enhance commercial value; (4) the composition can be very low in free or uncombined formaldehyde; (5) its C-stage products can have outstanding resistance to punking or thermal attack and, (6) a suitably hard adhesive can be provided. Its preparation is very efficient, and its use is advantageous as well.

DETAIL

The term res(ole)(itol)(ite)-melamine describes subject matter within the spirit and scope of the present invention in which residues of a free melamine are contained within a resole, a resitol or a resite. These resoles, resitols and resites are A-stage, B-stage and C-stage compositions, respectively.

The res(ole)(itol)(ite)-melamine and the like composition contains residues of at least one phenolic compound, at least one aldehyde and at least one free melamine. Each of these residues can be present in any appreciable amount. Desirably however, molar equivalent ratios of the residues of the free melamine(s) to aldehyde(s) to phenolic compound(s) are separately at each occurrence those about from 0.04:1.5:1 to 2:6:1 and more desirably about from 0.2:2.5:1 to 0.8:3.5:1, respectively.

The fundamental alkaline resoles are such compositions as, for example, those conventional resoles which are typically reaction products of at least one phenol compound with at least one aldehyde, commonly under alkaline catalyzed conditions, and can be often be thus typical resoles per se. Residues of the phenolic compound(s) and aldehyde(s) can be present in any suitably appreciable amount therein. Desirably however, molar equivalent ratios of the residues of the aldehyde(s) to the residues of the phenolic compound(s) therein are those about from 1.5:1 to 6.0:1, and more desirably about from 2.5:1 to 3.5:1, respectively.

The phenolic compounds are organic compounds bearing at least one such moiety as a hydroxyl moiety which is directly covalently bonded to a moiety such as a six-membered aromatic carbocyclic nucleus. By way of illustration, examples of suitable phenolic compounds include phenol per se, i.e., hydroxybenzene, and substituted phenols, for example, cresols, and so forth and the like. Phenol per se is preferred.

The aldehydes are such organic compounds as those bearing at least one aldehyde functionality. By way of illustration, examples of suitable aldehydes include formaldehyde, acetaldehyde, propionaldehyde, furfural and so forth and the like. Formaldehyde is preferred, especially as aqueous concentrated formaldehyde, e.g., formalin 50, or the like.

The free melamines herein are melamine or melamine-like compounds which are essentially, and desirably totally, not derivatized. The free melamines as used herein are organic compounds containing at least three such moieties as organic nitrogen, each of which have at least one such moiety as an active hydrogen bonded thereto. Excluded thus are such alkoxylated melamines as methoxylated melamine, melamines stabilized with diols, triols and so forth and the like. Examples of suitable free melamines include melamine per se, i.e., cyanurotriamide, other aminotriazines, guanidines, and so forth and the like. Melamine per se is preferred.

Also, when in the aqueous A-stage state, water itself is generally present in any suitable amount. Such water is typically present about from 20 to 80 percent by weight of this total liquid composition, and often about from 40 to 50 or to 60 percent by weight of this liquid composition.

Additional components may also be added and may include common water treatment chemicals (precipitation threshold inhibitors) such as, for example, phosphonates, polyacrylates or polymethyl methacrylates, which may be added if desired to prevent build-up of such common hard-water deposits as, for example, calcium carbonates and sulfates, in end use application equipment. Also, on one hand, the additional components may also include curing retarders such as, for example, urea or alpha-methyl glucoside, which can be added to prevent binder pre-cure during manufacture of C-stage products in often very hot fiber collection chambers. These additives may also reduce the hardness or brittleness properties of the final C-stage binder composition. For example, urea type additives can be advantageously employed in connection therewith, particularly when the product is a thermal insulating product. On the other hand, the additional component(s) may include such an acidic curing accelerator as, for example, ammonium sulfate, as desired. Such thus-blended compositions are contemplated to be broadly within the scope of this invention as well.

When the composition of the invention is in the form of a B-stage or C-stage, the residues of the phenolic compound(s), aldehyde(s) and free melamine(s) are present in amounts generally equivalent to those in the corresponding A-stage composition of the invention, keeping in mind the chemical changes through which these components undergo in curing. However, any such components as water are desirably present in amounts substantially less in the B-stage than in the liquid state composition and even less so in the C-stage. Amounts of the additional, and any extra, components are, in general, correspondingly higher.

Extra component(s) are more desirably present for the B-stage or especially the C-stage compositions of the invention. The extra component(s) can include substantial amounts of such mineral fiber(s) as glass wool, rock wool or other mineral fiber(s), which can be used, for example, in providing mineral fiber liquid filter tube cartridges with the free resole-melamine composition, by methods analogous to known methods for providing such otherwise known materials. For instance, the adhesive binder composition of the invention can be present in any appreciable binding amount with such mineral fibers, say, about from 1 to 20 percent by weight of such mineral fibers and more desirably about from 8 to 15 percent by weight. The remaining portion thereof is substantially the mineral fiber(s).

However, glass fiber-containing products most suitably made by the free melamine(s) residue-containing binder of this invention are those such as pipe insulation or brake insulation molded automotive products such as automotive top liners and hood liners, glass fiber air filtration media, glass fiber liquid filtration media, high density glass fiber board products, and so forth.

Nonetheless the extra component(s) bindable by the A-stage composition of the invention can include not only such mineral fibers as glass wools, rock wools and so forth, but also virtually any bindable substance. Suitable examples include: woods, crushed nut hulls, cloths, papers, suitable synthetic organic fibers such as plastics, metals, crushed stones, cement, leathers, and so forth and the like. Curing to the C-stage is advantageously carried out in order to generally effect maximum binding capabilities.

Preparation of the composition(s) of the invention as a minimum generally involves (1) contacting the fundamental alkaline resole(s) and the free melamine(s), (2) conditioning and (3) providing acidic conditions for the foregoing conditioned mixture with further conditioning, under conditions such that the composition(s) of the invention is(are) prepared. The conditions include aqueous conditions to at least the A-stage form of the composition of the invention.

The fundamental alkaline resole is generally prepared by contacting of the phenolic compound(s) with the aldehyde(s), advantageously under aqueous conditions. This preparation generally involves a procedure which is, or which is analogous to, for example, the well-known preparation of a resole by the aqueous alkaline methylolation of phenol per se with formaldehyde at suitable temperatures. Typically, such temperatures include those about from 40° C. to 70° C. A relatively high pH such as about from 8.5 to 9.5 is also typically employed. These conditions promote the reaction as is generally indicated by a decrease in the concentrations of formaldehyde and of phenol.

Virtually any strongly basic substance that does not react with the aldehyde and that is soluble in water may be used to promote the fundamental alkaline resole forming reaction. These basic substances include, for example, alkali metal oxides and hydroxides, especially those of sodium and potassium, alkaline earth metal oxides and hydroxides and low molecular weight tertiary amines such as triethyl amine, and so forth.

Commonly, one mole of the phenolic compound(s) is condensed with about from 1.5 to 6 moles of aqueous aldehyde until the free phenolic content is about from 1.0 to 2.0 percent by weight of the original phenolic compound(s) content in solution before the basic catalyst is added, and the free aldehyde content is about from 20 to 40 percent by weight of original aldehyde added. In particular, phenol per se and formaldehyde are desirably employed in this manner.

In view of the foregoing, it is more particularly desirable to add enough basic catalyst to the solution to maintain the pH about from 8 to 10, especially about from 8.5 to 9.3, preferably at about 8.6 or slightly above to even about 9.2, so that a significant portion of such a weak acid as phenol per se will be ionized and be reactive towards the formaldehyde. Typically, about from 0.05 to 0.3 mole equivalents of basic catalyst per mole of the phenolic compound(s), for example, phenol per se, are added. Higher levels of basic catalyst can increase costs since higher levels of acid are correspondingly required for the acidification for the preparation of the compositions of the invention, especially in regard to the preparation of the A-stage composition. Also, higher levels of soluble inorganic or organic acid-base salts formed thereby may cause undesirable performance. However, the fundamental alkaline resoles suitable for employment in this invention are of an alkaline, i.e., basic, nature.

In the practice of this invention, the fundamental alkaline resole(s) is(are) contacted with the free melamine(s). Amounts of the free melamine(s) contacted with the fundamental alkaline resole(s) can vary widely. However, the compositions of the invention are desirably prepared at least to the A-stage by adding from about 4 to 50 percent free melamine(s) based on the weight of resole residue(s) in the mixture, or in a molar equivalent ratio of free, initially uncombined aldehyde(s) to free melamine(s) about from 0.3:1 to 6:1, more desirably about from 1:5 to 3:1. In other words, desirably, free melamine(s) is(are) added to the fundamental alkaline resole(s) in aqueous solution form, in order to provide a molar ratio of residues of the free melamine(s) to residues of the total phenolic compound(s) present in the fundamental alkaline resole(s) about from 0.04:1 to 2.0:1. Additional aldehydes(s) necessary to complete the preparation may also be added at this point, but this is not a desirable circumstance. Less free melamine(s) can be employed in the event the composition is to contain such additional ingredients as a urea type additive and so forth.

Temperatures of the contact between the fundamental alkaline resole(s) and the free melamine(s) can vary. However, they are typically about from 20° C. to 70° C., desirably about from 40° C. to 60° C., and especially about 50° C.

This mixture is next conditioned. Conditioning generally involves providing suitable reaction conditions for the mixture in order to appropriately advance the composition, through the alkaline methylolation or the like of the added free melamine(s) with the remaining uncombined aldehyde(s) in the resole. Mixing of this mixture by such agitating means as stirring, bubbling, shaking and so forth and the like for any period of time may suffice for this conditioning step. In general, this mixture is stirred about from several minutes to several hours, at suitable temperatures. The mixing conditions can thus include those about from ten minutes to ten hours at about from an ambient to a mildly elevated temperature, say, about from 20° C. to 70° C., for instance, for about one hour at about 50 C. In general, this conditioning is that which is required to dissolve at least a substantial portion of the free melamine(s).

After this conditioning, the temperature of the mixture is in general brought to such temperatures as will function to provide appropriate conditions for the acidification step. Desirably, such temperatures include those about from 0° C. to 50° C., and more typically to about from 10° C. to 30° C.

The acidification step further conditions the mixture. As such, it is a reaction step.

Desirably, the acidification step is carried out as soon as practicable after the foregoing conditioning, which is most desirably carried out immediately after attaining the foregoing post-conditioning temperatures because further conditioning at such temperatures as those within the mentioned post-conditioning temperatures can cause precipitation of methylol melamines and the like, and these are difficult or impossible to redissolve, requiring temperatures exceeding, for example 80° C., a temperature that typically reduces the capacity for high water tolerance of the finished A-stage product. Advantageously, the mixture is immediately acidified to a pH about from 5.5 to 6.5 but is most desirably acidified to a pH about from 6.0 to 6.3, by the addition of any suitable acid. Mixtures of acids may be suitably employed in the practice of this invention.

Examples of suitable acids employable in the practice of this invention include sulfamic, ortho-, meta- and/or paratoluene sulfonic, sulfuric, formic, acetic and maleic acids. Selection of the acid(s) depends mainly upon the basic catalyst residues which may be present in the fundamental alkaline resole(s) employed herein and upon the end use requirements for the product. Although a large number of suitable acids exist and may be used for obtaining an aqueous solution pH in the desired range, their use may be less desirable. For example, many acids such as carbonic, phosphoric, oxalic or citric acids form insoluble precipitates in aqueous mixtures with many metal ions which may be in the fundamental alkaline resole(s), for example, calcium ions, and so forth, and if formed, such precipitates, for example, calcium citrate, should be filtered off or suitably suspended. Accordingly, sulfamic acid is preferably employed in the practice of this invention. The use of such an acid as sulfamic acid in the neutralization/acidification step can improve the solubility of the melamine formaldehyde polymer over its otherwise obtainable solubility in aqueous solutions with even such acids as the toluene sulfonic acids.

The acidification reaction is carried out at suitable temperatures. These temperatures desirably include those about from 20° C. to 40° C.

The acidification reaction is allowed to proceed for a suitably short period of time. In general, this is the time needed so that, after neutralization to a pH of about 7 to 8 with a suitable base, the molecular weight of the resulting A-stage product is low enough for the product to be able to generally remain dissolved at all concentrations in aqueous media, over prolonged periods of time at temperatures preferably about from 0° C. to 5° C. The time for the acidification step can be, for example, within a range about from 10 minutes to two hours or so, typically within about from 20 to 60 minutes, depending primarily upon the pH of conditioning as provided by the acid content, the temperature and so forth. A greater acid content and a higher temperature generally evokes a shorter time for the acidification step. A longer time acidification step, based upon these parameters, can result in a more easy to control preparation process and consequently often a better, more uniformly reproducible product, however.

The acidification reaction is generally terminated by neutralization. However, if neutralization of the acidification step occurs too soon, neutralized samples can show large amounts of fluffy white sediment after remaining for 16 hours at 0° C. This material is believed to be a methylol melamine oligomer or the like. If neutralization of the acidification step occurs too late, these neutralized samples show limited tolerance to water or show a severely reduced storage life as measured by loss of water tolerance. Dilution of the mixture with additional water and/or other resole products added to further reduce solids content such as can provide a modulating effect which permits good control of polymer molecular weight during the acidification reaction.

Further, tetra-dimer crystallization is generally not observed in samples prepared in accordance with the present invention, regardless of acidification time. Nonetheless, reaction times, temperature and pH must be very closely controlled with the present invention in order to eliminate melamine polymer crystallization and yet preserve water tolerance. This is due to the very high reactivity of the melamine-containing resole product.

It is also desirable to carefully monitor cold water solubility of the acidified solution as the reaction progresses. This is easily done by diluting a sample of the reaction solution with 10 parts water and cooling the diluted sample in a methanol ice bath. Such a diluted sample will generally become turbid at progressively higher and higher temperatures as the reaction advances. The temperature of such turbidity is commonly referred to as the cloud point temperature. A generally lower cloud point temperature indicates an A-stage product of the invention which has superior water tolerance and a generally lower molecular weight, and vice versa. The reaction is thereby conveniently interrupted by neutralization with a suitable base before the cloud point temperature exceeds about 5° C., for example. This insures that the finished product will remain fully tolerant to water for prolonged periods of time when safe-stored, i.e., stored in a covered container away from actinic radiation, generally below 5° C.

Nonetheless, if a precipitate is formed undesirably, it may be removed from the A-stage product of the invention. Suitable removal methods are known in the art and include, for example, filtration, centrifugation, decanting and so forth.

The resulting liquid product of the invention can be generally translucent or transparent and colorless, is very low in free phenols, typically no more than about 1.0 percent by weight as determined by gas chromatography, is very low in free aldehyde, which can be thus no more than about 1.0 percent by weight as determined titrimetrically, that level which is generally not detectable by smell, i.e., no more than about 0.5 percent by weight as is determined titrimetrically and typically no more than about 0.3 percent by weight as is determined titrimetrically, and the A-stage product of the invention can have a tolerance to water, especially initially, exceeding 5,000 percent by weight. The A-stage product of the invention as substantially composed of the residues of the phenolic compound(s), the aldehyde(s), the free melamines(s) and water, can be substantially or even completely fully water tolerant when safe-stored about from 0° C. to 5° C. for up to a month or more.

Herein, the titrimetric determination of free aldehydes is generally carried out by contacting a small sample of the batch with a small sample of a 50 percent by weight aqueous ammonium thiocyanate mixture. Titrating for any thiocyanic acid which is liberated gives the amount of any free aldehydes present.

The percent of water tolerance is based upon the weight of dilution water added to the organic components plus water of preparation of the aqueous A-stage composition of the invention. When a liquid has a water tolerance about or exceeding 5,000 percent by weight, it is said to be fully water dilutable or infinitely water dilutable, or it is said to have infinite water tolerance. As an illustration, when 50 parts by weight dilution water at 25° C. is added to one part by weight A-stage composition of the invention, which generally provides a colorless, translucent aqueous solution, the water tolerance is said to be 5,000 percent. If a turbid solution were to form just as if, for example, 9 parts by weight water were to be added to one part by weight resole, the water tolerance would be only 900 percent. This phenomena occurs as a consequence of the solvating power of the specific resole which is generally high in organic content. The solubility of higher molecular weight, less soluble species are reduced through reduction of the organic content by dilution water. Water tolerance decreases in storage due to thermal o formation of higher and higher concentrations of higher and higher molecular weight species. The cloud point temperature similarly increases, but generally before the water tolerance decreases. For these reasons, a relationship exists such that, for example, a resole sample with a cloud point temperature of 17° C. has a water tolerance of 2000 percent, and a sample with a cloud point temperature of 25° C. has a water tolerance of 1000 percent (10:1 dilution in test). A sample with a cloud point temperature of 14° C. is infinitely tolerant to 20° C. water in general.

In general, any addition of the additional component(s), for example, urea resoles and so forth or the like, is desirably carried out after the A-stage composition of the invention is prepared. Any such addition is best carried out immediately prior to curing to B-stage or C-stage forms.

The B-stage and C-stage compositions of the invention can be prepared from the A-stage composition of the invention by appropriate curing. Such curing typically involves elevated temperatures as is the case with other known binding composition. For example, with the formation of a resinated glass fiber matrix, the C-stage composition is formed by the application of heat to the matrix in a press, mold or curing oven.

Furthermore, the compositions of the invention have such particular properties as those which include that the C-stage glass fiber composition can be very hard and stiff. Also, the binder of the invention generally has good antipunk properties.

The following examples further illustrate the invention. Parts and percentages therein are by weight.

EXAMPLE 1

A fundamental alkaline resole is prepared by first, mixing the following components at 40° C. in the listed proportions:

| Phenol per se | 32.27% |
| Formaldehyde (50% aqueous) | 63.86% |
| Sodium hydroxide (50% aqueous) | 3.87% | and second, conditioning the mixture at 60° C. until the free formaldehyde content is 8.5 percent. To 500.0 g of this fundamental alkaline resole is added 212.6 g of a slurry of 50 parts water and 50 parts melamine per se, with stirring, and this mixture is conditioned at 50° C. for 90 minutes. The latter mixture is cooled to 25 C. whereupon 78.7 g of a sample of industrial grade toluene sulfonic acid primarily composed of the ortho- and para-isomers (68 percent aqueous) is added. The pH of the lattermost mixture thus becomes 6.0, and this lattermost mixture is held at 30° C. and pH 6.0 for 25 minutes whereupon 9.2 g of sodium hydroxide (50 percent aqueous) is added. Melamine solids are filtered therefrom, yielding 5.3 g of such solids when they are washed and dried. The final A-stage composition is safe-stored at 5° C. More properties of this A-stage composition include the following:

| % Free Formaldehyde | Less than 0.3 (titrimetric) |
| % Free Phenol | 0.68 (gas chromatography) |
| % Owens Solids | 53.15 |
| pH | 7.82 |
| Specific Gravity | 1.220 |
| Refractive Index | 1.4833 |
| % Water Tolerance | Greater than 5000 |
| Cloud Point Temperature | 5° C. |

This sample shows flocculation and sedimentation after one week at 5° C. Flocculate material readily redissolves with warming to about from 50° C. to 55° C., and the water tolerance is so measured. The water tolerance after safestorage for 2 months at −5° C. as measured thus is 461 percent.

EXAMPLE 2

To 500 g of the fundamental alkaline resole of Example 1 is added 176 g of a slurry of 50 parts water and 50 parts melamine per se, with stirring. This mixture is next conditioned for 1 hour at 50° C., which leaves only the most minute trace amounts of undissolved melamine. The mixture is next cooled to 25° C. and is acidified to pH 6.1 with 196.7 g of a 20 percent aqueous sulfamic acid solution and next is held at 30° C. and pH 6.1 for 30 minutes. The mixture is next neutralized to pH 7.8 with a small amount of 50 percent sodium hydroxide. The cloud point temperature of the acidified mix is less than −3° C. at the neutralization. The final A-stage product exhibits the following properties:

| % Free Formaldehyde (titrimetric) | Less than 0.3 |
| % Free Phenol (gas chromatography) | 0.68 |
| % Owens Solids | 46.1 |
| pH | 7.8 |
| Specific Gravity | 1.202 |
| Refractive Index | 1.4620 |
| Cloud Point Temp., initially | Less than −3° C. |
| Cloud Point Temp, after 3 weeks at 5° C. | 12° C. |
| Cloud Point Temp, after 4 weeks at 5° C. | 17° C. |
| Water Tolerance, initially | Infinite |
| Water Tolerance after 8 weeks at 5° C. | 500% |

The final A-stage product contains generally no melamine solids, and it remains free of sediment as observed upon safe-storage for 8 weeks at 5° C. A sample of the final A-stage product, however, does show sedimentation after 8 weeks at −5° C.

EXAMPLE 3

A sample of 444 pounds of fundamental alkaline resole, is as formulated in Example 1, has the following properties:

| % Free Formaldehyde | 8.6 |
| Refractive Index | 1.4840 |
| Salt Water Tolerance in 25% NaCl (aq.) | 275% |

To this sample at 50° C. is added 156 pounds of a slurry of 50 parts water and 50 parts melamine per se, with stirring, and the mixture is conditioned at 50° C. for one hour until all the melamine dissolves in the resole. The reaction mixture is next immediately cooled to 30° C., and the addition of 20 percent sulfamic acid aqueous solution is started. The pH is continuously monitored with an on-line pH monitor. When enough acid is added to reduce the pH to 7.0, the addition of the acid is stopped, and the batch temperature is readjusted to 30° C. as batch temperature rises from 30° C. to 34° C. upon addition of the acid. With batch temperature at 30° C., acid addition is again continued until the pH of the batch reaches from 6.22 to 6.24. This batch is held at the latter pH and temperature for 43 minutes. Next, a sample of 6.3 pounds of 50 percent (aqueous) sodium hydroxide is added to raise the batch pH to 8.15. The cloud point temperature does not exceed $-3°$ C. during this latter reaction. The batch is next cooled rapidly to 15° C., is placed in lined steel 45 gallon drums and is further cooled to 5° C. The batch which is formed is fully water soluble. The following properties are further observed for this cooled liquid material:

| | |
|---|---|
| % Owens Solids | 46.5 |
| Cloud Point Temp. | $<-3°$ C. |
| % Free Formaldehyde | 0.26 (titrimetric) |
| % Free Phenol | 0.67 (gas chromatography) |
| Specific Gravity | 1.205 |
| pH | 8.30 |
| Refractive Index | 1.4630 |

EXAMPLE 4

The A-stage composition of Example 3 is employed in the manufacture of glass fiber liquid filter tube cartridges. The A-stage composition is diluted to suitable levels of solids and is sprayed onto cast glass wool as the cast glass wool is dropped onto a collecting conveyor belt. The composition-containing fibers are next spun on mandrels. This is followed by curing the composition in a curing oven. The weight ratio of the foregoing adhesive binder component of the composition of the invention which is cured to the C-stage is about 15 percent, the glass wool component thus being about 85 percent. This filtration media is substantially malodour-free and is non-corrosive to such metals as coinage and noble metals.

EXAMPLE 5

Pipe insulation is made with the A-stage composition of Example 3 by known methods. The final C-stage composition has about 8–12 percent binder and about 88–92 percent glass fiber and is non-odoriferous, non-corrosive and non-punking.

Conclusion

Res(ole)(itol)(ite)-melamine and the like compositions and so forth are thus provided. Numerous modifications and adaptations can be carried out by those skilled in the art, to include those ordinarily skilled in the art, without departing from the spirit and scope of this invention, especially as particularly pointed out by the distinctly claimed subject matter which follows.

I claim:

1. A composition of matter comprising a res(ole)-(itol)(ite)-melamine composition, including an essentially aqueous A-stage form of said resolemelamine composition containing residues of free melamine(s) to aldehyde(s) to phenolic compounds(s) in a molar equivalent ratio ranging from about 0.2:1.5:1 to 0.8:3.5:1, which A-stage form is low temperature safe-storage stable, has a cloud point temperature of about 5° C. or less at the time of formation and is essentially infinitely water soluble.

2. The composition of claim 1 wherein the resolemelamine composition comprises residues of hydroxybenzene, formaldehyde and cyanurotriamide.

3. The composition of claim 1 wherein said A-stage has low temperature safe-storage stability for at least about two weeks at 5° C.

4. The composition of claim 1 wherein said A-stage has no more than about 1.0 percent by weight free formaldehyde as determined titrimetrically by employing 50, percent by weight aqueous ammonium thiocyanate.

5. The composition of claim 1 wherein the molar equivalent ratio of the residues of the free melamine(s) to aldehyde(s) to phenolic compound(s) ranges from about 0.2:2.5:1 to 0.8:3.5:1, respectively.

6. The composition of claim 1 comprising a B-stage form of the composition.

7. The composition of claim 1 comprising a C-stage form of the composition.

8. The composition of claim 7 which exists in conjunction with and about a mineral fiber matrix.

9. A composition of matter comprising a res(ole)-(itol)(ite)-melamine composition prepared by a process which comprises steps of serially contacting at least one fundamental alkaline resole which comprises residues of at least one phenolic compound and at least one aldehyde in a molar equivalent ratio of residues of aldehyde(s) to phenolic compound(s) from about 1.5:1 to 6:1 with at least one free melamine, wherein sufficient free melamine is contacted therewith to at least initially provide an essentially aqueous A-stage form of said composition having a molar equivalent ratio of residues of the free melamine(s) to the aldehyde(s) to the phenolic compound(s) ranging from about 0.04:1.5:1 to 2:6:1; conditioning so as to dissolve at least a substantial portion of said free melamine, and providing acidic conditions of at least pH 5.5 therefor with further conditioning for a time ranging from about 10 minutes to 2 hours at temperatures ranging from about 10° to 50° C., under conditions aqueous to at least the A-stage such that said composition is prepared.

10. The composition of claim 9 wherein sulfamic acid is employed in the acidic conditioning and wherein the composition is essentially infinitely water soluble and low temperature safe-storage stable for at least about two weeks at 5° C. in its A-stage.

11. The composition of claim 9 comprising a B-stage form of the composition formed by curing the A-stage form of the composition.

12. The composition of claim 9 comprising a C-stage form of the composition formed by curing the A- or B-stage form of the composition.

13. The composition of claim 9 wherein said free melamine is selected from the group consisting of aminotriazines and quanidine.

14. A process for preparing a res(ole)(itol)(ite)-melamine composition comprising serially contacting at least one fundamental alkaline resole which comprises residues of at least one phenolic compound and at least one aldehyde in a molar equivalent ratio of residues of aldehyde(s) to phenolic compound(s) from about 1.5:1 to 6:1 with a sufficient quantity of at least one free melamine to at least initially provide an essentially aqueous A-stage form of said composition having a molar equivalent ratio of residues of the free melamine to the aldehyde to the phenolic compound of from about 0.04:1.5:1 to 2:6:1, conditioning so as to dissolve at least a substantial portion of said free melamine, and providing acidic conditions of at least pH 5.5 therefor with further conditioning at temperatures ranging from about 10° to 50° C. for a time ranging from about minutes to 2 hours, under conditions aqueous to at least the A-stage such that said composition is prepared.

15. The process of claim 14 wherein said composition is essentially infinitely water soluble and low temperature safe-storage stable for at least about two weeks at 5° C. in its A-stage.

16. The process of claim 15 wherein the phenolic compound(s) is hydroxybenzene; the aldehyde(s) is formaldehyde, and the free melamine(s) is cyanurotriamide.

17. The process of claim 14 comprising use during the acidic conditions of at least one acid selected from the group consisting of sulfamic, toluene, sulfonic, sulfuric, formic, acetic, and maleic acids.

18. The process of claim 17 wherein the acid(s) is(are) at least one acid selected from the group consisting of sulfamic, toluene sulfonic, formic, acetic and maleic acids.

19. The process of claim 18 wherein the acid(s) is(are) at least one acid selected from the group consisting of sulfamic and toluene sulfonic acids.

20. The process of claim 19 wherein the acid is sulfamic acid.

21. The process of claim 16 further comprising use during the acidic conditions of sulfamic acid.

22. The process of claim 14 further comprising curing to at least a B-stage form of the composition.

23. The process of claim 22 further comprising curing to a C-stage form of the composition.

24. The process of claim 14 wherein an additional quantity of said free melamine is added to said composition after the acidic conditioning and the lowering of the acidity of the A-stage composition, the quantity thereof being effective as a cure retarder for said composition.

25. A method for binding bindable materials comprising contacting said materials with a res(ole)(itol)(ite)-melamine composition prepared according to claim 14 which when in its A-stage is low temperature safe-storage stable under conditions such that said materials are bound thereby.

26. The method of claim 25 wherein said materials include mineral fibers.

27. The method of claim 26 wherein the mineral fibers are glass.

28. The method of claim 26 further comprising curing the composition to a C-stage form.

29. A composition of matter comprising a res(ole)-(itol)(ite)-melamine composition prepared by a process comprising the steps of serially contacting at least one fundamental alkaline resole which comprises residues of hydroxybenzene and formaldehyde in molar equivalent ratios of residues of formaldehyde to hydroxybenzene ranging from about 1.5:1 to 3.5:1 with cyanurotriamide in an amount effective to provide an essentially aqueous A-stage form of said composition having a molar equivalent ratio of residues of the cyanurotriamide to the formaldehyde to the hydroxybenzene ranging from about 0.2:2.5:1 to 0.8:3.5:1, conditioning so as to dissolve at least a substantial portion of said cyanurotriamide, and providing acidic conditions of pH 5.5 to 6.5 therefor with further conditioning at temperatures ranging from about 10° to 50° C. for a time ranging from about 10 minutes to 2 hours under conditions aqueous to at least the A-stage such that a composition is prepared in which the A-stage composition has a cloud point temperature of about 5° C. or less and at the time of formation and is essentially infinitely water soluble.

30. The process of claim 24 wherein the free melamine added comprises cyanurotriamide.

31. The composition of claim 29 wherein said acidic conditions are provided by the addition of sulfamic acid.

32. An essentially aqueous A-stage form of a resole-melamine composition in which the resole is prepared from aldehyde(s) to phenolic compound(s) in a molar equivalent ratio ranging from about 2.5:1 to 3.5:1 and a free melamine is added to said resole in quantities such that the molar equivalent ratio of said free melamine to said phenolic compound(s) ranges from greater than 0.2:1 to 0.8:1, said composition being low temperature safe-storage stable, having a cloud point temperature of about 5° C. or less at the time of formation and being essentially infinitely water soluble.

* * * * *